United States Patent [19]

Kawamoto

[11] Patent Number: 5,698,378
[45] Date of Patent: Dec. 16, 1997

[54] RECOVERY OF PHOTOGRAPHIC POLYESTER SUPPORT

[75] Inventor: Fumio Kawamoto, Kanagawa, Japan

[73] Assignee: Fuji Photo Film Co., Ltd., Kanagawa, Japan

[21] Appl. No.: 559,086

[22] Filed: Nov. 17, 1995

[30] Foreign Application Priority Data

Nov. 18, 1994 [JP] Japan .................. 6-284892

[51] Int. Cl.⁶ .................. G03C 11/24; G03C 1/83; C08J 11/04
[52] U.S. Cl. .................. 430/347; 430/533; 521/48
[58] Field of Search .................. 430/347, 533; 521/48

[56] References Cited

U.S. PATENT DOCUMENTS

| | | | |
|---|---|---|---|
| 4,448,850 | 5/1984 | Upson et al. | 428/510 |
| 4,765,835 | 8/1988 | Schoenhard | 75/118 P |
| 5,523,329 | 6/1996 | Moore et al. | 521/48 |

FOREIGN PATENT DOCUMENTS

| | | | |
|---|---|---|---|
| A354557 | 3/1991 | Japan | G03C 11/24 |
| A497335 | 3/1992 | Japan | G03C 1/00 |
| A593976 | 4/1993 | Japan | G03C 1/00 |
| A6138582 | 5/1994 | Japan | B32B 27/28 |
| 104938 | 11/1992 | Romania | G03C 11/24 |
| 1176295 | 8/1985 | U.S.S.R. | G03C 11/24 |
| 1681295 | 9/1991 | U.S.S.R. | G03C 11/24 |

*Primary Examiner*—Mark F. Huff
*Attorney, Agent, or Firm*—Sughrue, Mion, Zinn, Macpeak & Seas, PLLC

[57] ABSTRACT

A photographic material comprising a polyester support and an undercoat and/or backcoat layer applied thereto is treated with an alkaline aqueous solution of sodium hydroxide and/or potassium hydroxide. The polyester support can be recovered for reuse without quality degradation like foreign matter contamination and transmittance losses.

10 Claims, No Drawings

RECOVERY OF PHOTOGRAPHIC POLYESTER SUPPORT

BACKGROUND OF THE INVENTION

1. Field of the invention

This invention generally relates to a photographic silver halide photosensitive material comprising a polyester support and an undercoat layer formed thereon and more particularly, to a method for recovering the polyester support from the photographic material in a reusable condition.

2. Prior Art

Recovery of photographic film using triacetyl cellulose (TAC) bases is disclosed in Japanese Patent Application Kokai (JP-A) Nos. 54557/1991, 97335/1992, and 93976/1993. These methods are effective for TAC, but not to photographic polyester supports. No effective methods are known for the recovery of polyester supports.

SUMMARY OF THE INVENTION

An object of the present invention is to provide, in conjunction with a photographic material comprising a polyester support and an undercoat layer and/or backcoat layer formed thereon, especially a photographic silver halide photosensitive material comprising a polyester support and an undercoat layer and/or backcoat layer formed thereon, a method for recovering the polyester support as reusable fragments in a safe manner and at a low cost.

The present invention relates to the disposal of a photographic material comprising a polyester support and an undercoat layer formed thereon. According to the invention, the photographic material is treated with an alkaline aqueous solution containing at least one of sodium hydroxide and potassium hydroxide for thereby recovering the polyester support.

DETAILED DESCRIPTION OF THE INVENTION

According to the invention, a photographic material comprising a polyester support and a subbing or undercoat layer formed thereon is treated with an alkaline aqueous solution containing sodium hydroxide and/or potassium hydroxide for thereby recovering the polyester support for reuse. Usually, the photographic material is cut into fragments or chips prior to treatment. The photographic material to be treated according to the invention encompasses cut scraps and perforation scraps left during manufacture of photographic material as well as rejected films.

The recovery treatment uses an aqueous solution containing sodium hydroxide or potassium hydroxide or both. The solution preferably has an alkali concentration of 0.2 to 10 N (normality), more preferably 0.3 to 3 N, most preferably 0.5 to 2 N. A solution having a lower alkali concentration below the range would little remove the undercoat, backcoat and emulsion layers whereas a solution having a higher alkali concentration .above the range would give rise to quality degradation as by lowering the molecular weight of polyester.

The treating temperature is generally 10° to 100° C., preferably 70° to 100° C., more preferably 75° to 95° C., most preferably 80° to 90° C. Lower temperatures are undesirable because a longer time is required for treatment and removal of the undercoat, backcoat and emulsion layers is incomplete. Temperatures above 100° C. add to the cost because of the increased consumption of heating energy. The treating time is generally about 5 to 1,000 minutes, preferably about 10 to 300 minutes, more preferably about 20 to 200 minutes, most preferably about 30 to 60 minutes.

In one preferred embodiment, the method of the invention further includes the step of water washing for about 1 to 60 minutes after the alkaline solution treatment. If desired, the alkaline solution treatment and water washing are alternately repeated, especially at least two times.

In the best mode, the photographic material is treated with an alkaline aqueous solution having an alkali concentration of 0.5 to 2 N at a temperature of 80° to 90° C. for about 30 to 60 minutes.

A surfactant may be added to the treating solution for preventing the recovered polyester support in chip form from being contaminated with impurities. The surfactants used herein include known nonionic surfactants, cationic surfactants and anionic surfactants. Among others, nonionic surfactants are preferred. Examples include polyoxyethylene alkyl ethers such as polyoxyethylene lauryl ether, polyoxyethylene cetyl ether, polyoxyethylene stearyl ether, and polyoxyethylene oleyl ether; polyoxyethylene alkyl phenol ethers such as polyoxyethylene octyl phenol ether and polyoxyethylene nonyl phenol ether; sorbitan fatty acid esters such as sorbitan monolaurate, sorbitan monopalmitate, sorbitan monostearate, sorbitan tristearate, sorbitan monooleate, and sorbitan trioleate; polyoxyethylene sorbitan fatty acid esters such as polyoxyethylene sorbitan monolaurate, polyoxyethylene sorbitan monopalmitate, poloxyethylene sorbitan monostearate, polyoxyethylene sorbitan tristearate, polyoxyethylene sorbitan monooleate, and polyoxyethylene sorbitan trioleate; polyoxyethylene fatty acid esters such as polyethylene glycol monolaurate; and glycerin fatty acid esters such as stearic acid monoglyceride.

The preferred surfactant is of the general formula (i):

wherein m is an integer of 10 to 20 and n is an integer of 3 to 20.

Although the concentration of the surfactant is not critical, it is preferred to add about 1 to 10,000 g, more preferably about 5 to 500 g, most preferably about 10 to 100 g of the surfactant to 1,000 liters of the treating solution.

The photographic material to be treated according to the invention includes a polyester support or base and an undercoat layer formed thereon. The photographic material may have a backcoat layer on the opposite surface of the support and typically a photosensitive emulsion layer on the undercoat.

The polyester support used herein is made of polymers such as polyethylene terephthalate (PET) and polyethylene naphthalate as disclosed in EP 0572275. In one preferred embodiment, the polyester support is composed mainly of naphthalene dicarboxylic acid and/or naphthalene dicarboxylate and ethylene glycol, especially of polyethylene-2, 6-naphthalene dicarboxylate.

Before the undercoat layer is formed thereon, the polyester support may have been surface treated for enhancing the adhesion of an emulsion layer to the support. Such surface treatments include glow discharge treatment, ultraviolet treatment, corona discharge treatment and flame treatment as disclosed in Technical Report 94-6023, 15/3/1994.

Further the polyester support may have been dyed with dyes to a color density of at least 0.03 for B, G and R. Even from such dyed polyester supports, the base stock can be recovered without impairing the color tone.

The invention is applicable even when the polyester support has been dyed with a compound of the following general formula (II) or (III).

General formula (II):

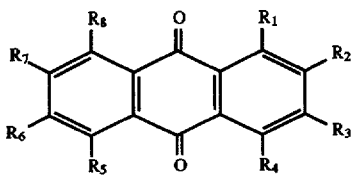

Each of $R_1$, $R_2$, $R_3$, $R_4$, $R_5$, $R_6$, $R_7$, and $R_8$ is a hydrogen atom, hydroxyl radical, aliphatic radical, aromatic radical, heterocyclic radical, halogen atom, cyano radical, nitro radical, $COR_9$, $COOR_9$, $NR_9R_{10}$, $NR_{10}COR_{11}$, $NR_{10}SO_2R_{11}$, $CONR_9R_{10}$, $SO_2NR_9R_{10}$, $COR_{11}$, $SO_2R_{11}$, $OCOR_{11}$, $NR_9CONR_{10}R_{11}$, $CONHSO_2R_{11}$ or $SO_2NHCOR_{11}$, wherein each of $R_9$ and $R_{10}$ is a hydrogen atom, aliphatic radical, aromatic radical or heterocyclic radical or $R_9$ and $R_{10}$ taken together may form a five- or six-membered ring, and $R_{11}$ is an aliphatic radical, aromatic radical or heterocyclic radical. Alternatively, $R_2$ may form a ring with $R_1$ or $R_3$.

General formula (III):

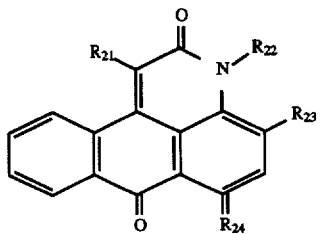

Each of $R_{21}$, $R_{23}$, and $R_{24}$ is a hydrogen atom, hydroxyl radical, nitro radical, cyano radical, aliphatic radical, aromatic radical, $COR_{29}$, $COOR_{29}$, $NR_{29}R_{30}$, $NR_{30}COR_{31}$ or $NR_{30}SO_2R_{31}$ wherein $R_{29}$ and $R_{30}$ are as defined for $R_9$ and $R_{10}$ in formula (II), and $R_{31}$ is as defined for R11 in formula (II). $R_{22}$ is an aliphatic radical or aromatic radical. It is noted that at least one of $R_{21}$, $R_{22}$, $R_{23}$, and $R_{24}$ is a radical other than hydrogen.

The respective radicals in formula (II) are described in detail. The aliphatic radicals represented by $R_1$ to $R_{11}$ include alkyl radicals having 1 to 20 carbon atoms (e.g., methyl, ethyl, n-butyl, isopropyl, 2-ethylhexyl, n-decyl and n-octadecyl), cycloalkyl radicals having 1 to 20 carbon atoms (e.g., cyclopentyl and cyclohexyl), and allyl radical, which all may have one or more substituents. Exemplary substituents are halogen atoms (e.g., F, Cl, Br and I), hydroxyl radical, cyano radical, nitro radical, carboxyl radical, aryl radicals having 6 to 10 carbon atoms (e.g., phenyl and naphthyl), amino radicals having 0 to 20 carbon atoms (e.g., $NH_2$, $NHCH_3$, $N(C_2H_5)_2$, $N(C_4H_9)_2$, $N(C_8H_{17})_2$, anilino, and 4-methoxyanilino), amide radicals having 1 to 20 carbon atoms (e.g., acetylamino, hexanoylamino, benzoylamino, and octadecanoylamino), carbamoyl radicals having 1 to 20 carbon atoms (e.g., unsubstituted carbamoyl, methylcarbamoyl, ethylcarbamoyl, octylcarbamoyl, and hexadecylcarbamoyl), ester radicals having 2 to 20 carbon atoms (e.g., methoxycarbonyl, ethoxycarbonyl, phenoxycarbonyl, n-butoxycarbonyl, and dodecyloxycarbonyl), alkoxy or aryloxy radicals having 1 to 20 carbon atoms (e.g., methoxy, ethoxy, butoxy, isopropoxy, benzyloxy, phenoxy, octadecyloxy), sulfonamide radicals having 1 to 20 carbon atoms (e.g., methanesulfonamido, ethansulfonamido, butansulfonamido, benzenesulfonamido, and octanesulfonamido), sulfamoyl radicals having 0 to 20 carbon atoms (e.g., unsubstituted sulfamoyl, methylsulfamoyl, butylsulfamoyl, and decylsulfamoyl), and five- or six-membered heterocyclic rings (e.g., pyridyl, pyrazolyl, morpholino, piperidino, pyrrolino, and benzoxazolyl).

The aromatic radicals represented by $R_1$ to $R_{11}$ include aryl radicals having 6 to 10 carbon atoms (e.g., phenyl and naphthyl) which may have one or more substituents. Exemplary substituents include the same substituents as mentioned above for the aliphatic radicals and alkyl radicals having 1 to 20 carbon atoms (e.g., methyl, ethyl, butyl, t-butyl, and octyl).

The heterocyclic radicals represented by $R_1$ to $R_{11}$ include five- or six-membered heterocyclic rings (e.g., pyridine, piperidine, morpholine, pyrrolidine, pyrazole, pyrazolidine, pyrazolone, and benzoxazole) which may have one or more substituents. Exemplary substituents include the same substituents as mentioned above for the aromatic radicals.

Examples of the five- or six-membered ring that $R_9$ and R10, taken together, form include morpholine, piperidine, and pyrrolidine rings. Examples of the ring that $R_2$ forms with $R_1$ or $R_3$ include five- or six-membered rings such as benzene and phthalimide rings.

Referring to formula (III), the aliphatic radicals represented by R21 to R24 are the same as the aliphatic radicals represented by $R_1$ to $R_{11}$ in formula (II), and the aromatic radicals represented by $R_{21}$ to $R_{24}$ are the same as the aromatic radicals represented by $R_1$ to $R_{11}$ in formula Several illustrative, non-limiting examples of the compounds of the general formulae (II) and (III) are given below.

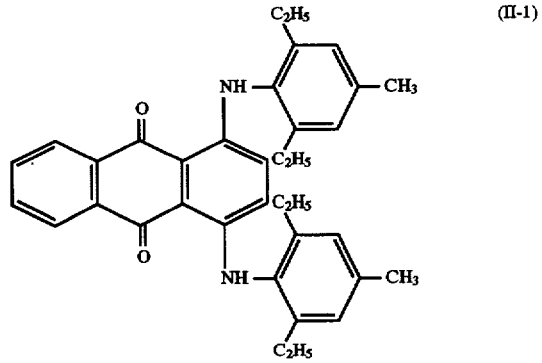

(II-1)

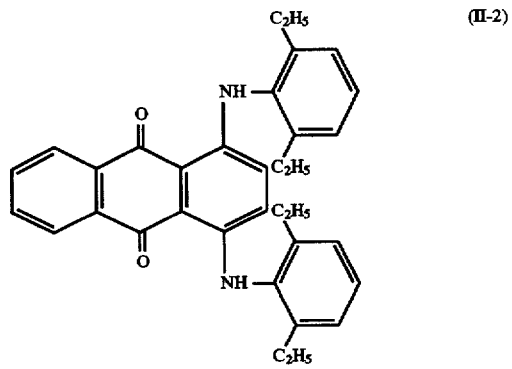

(II-2)

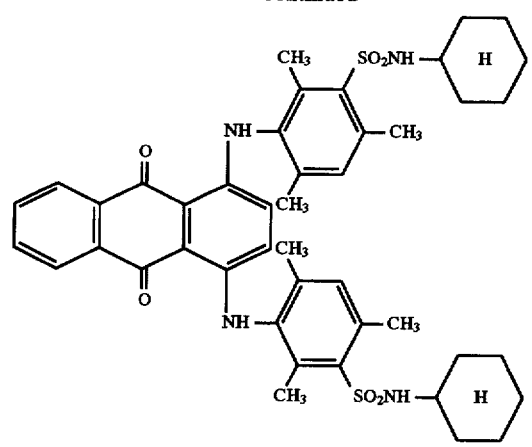
(II-3)
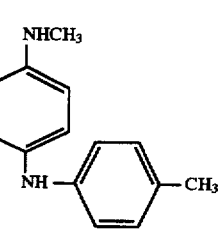
(II-4)
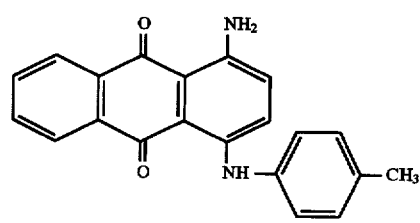
(II-5)
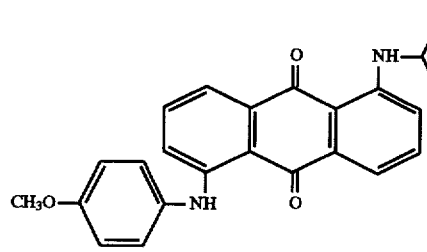
(II-6)
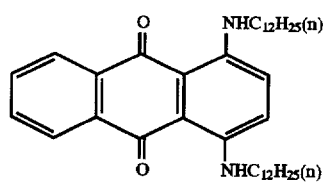
(II-7)
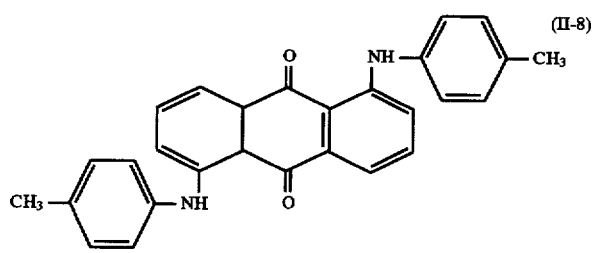
(II-8)
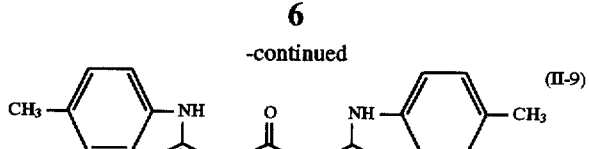
(II-9)
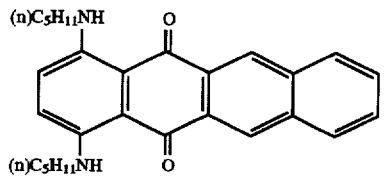
(II-10)
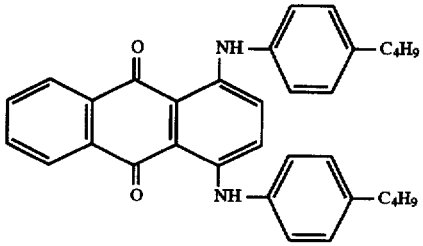
(II-11)
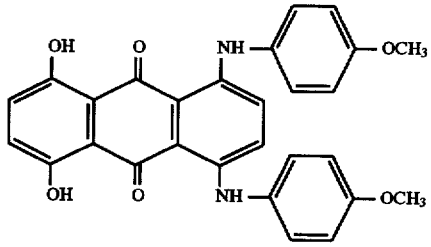
(II-12)
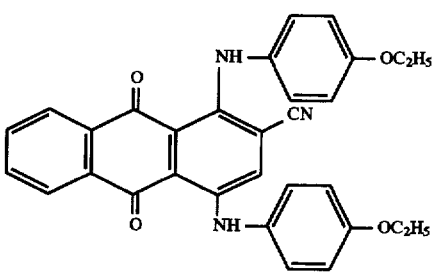
(II-13)
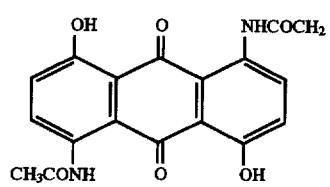
(II-14)
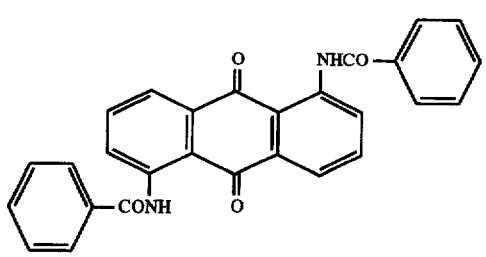
(II-15)

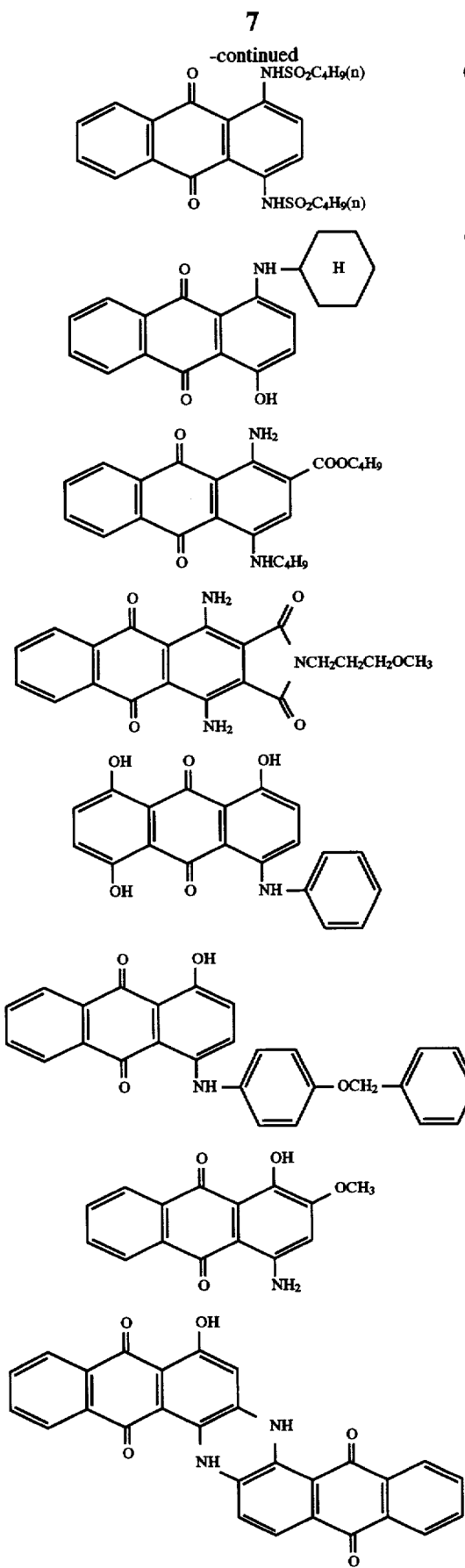
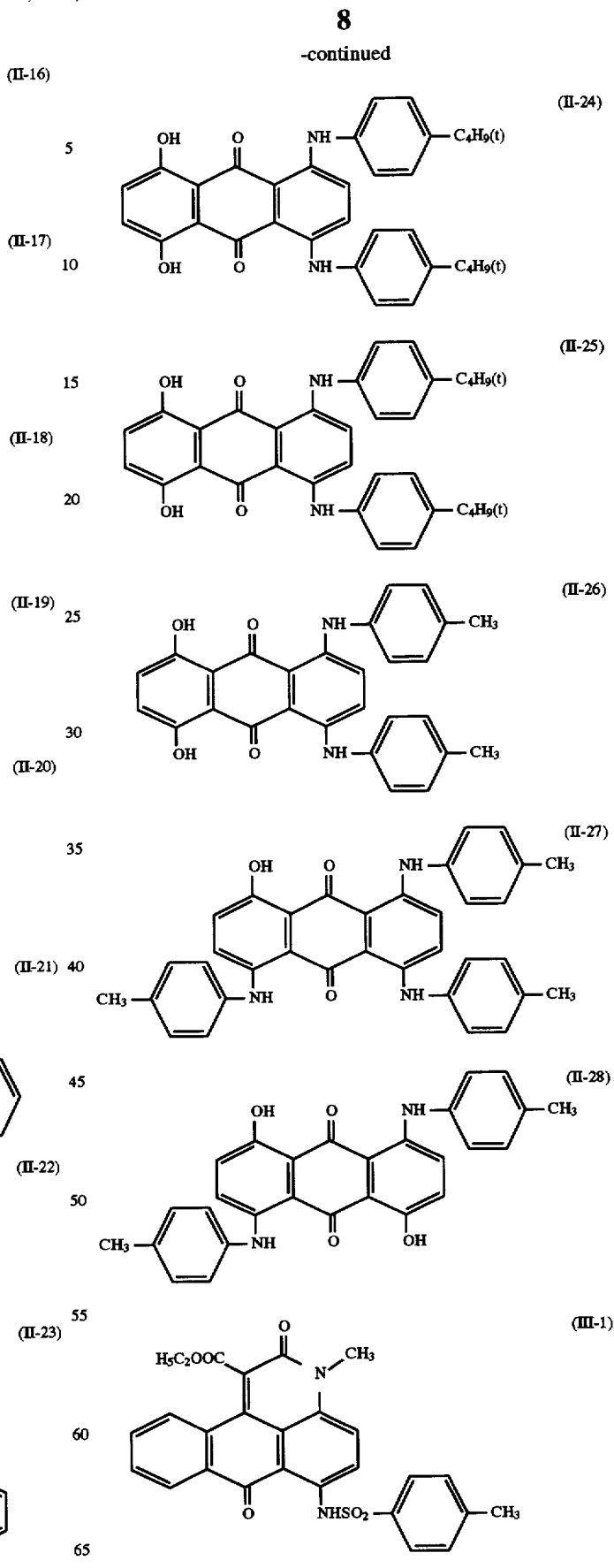

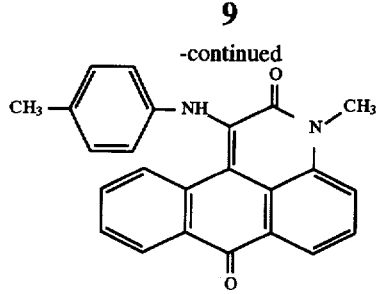
(III-2)

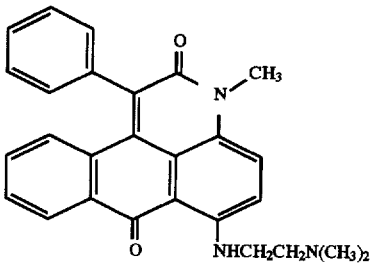
(III-3)

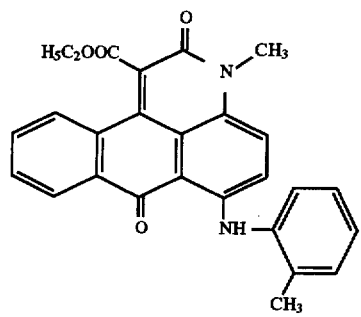
(III-4)

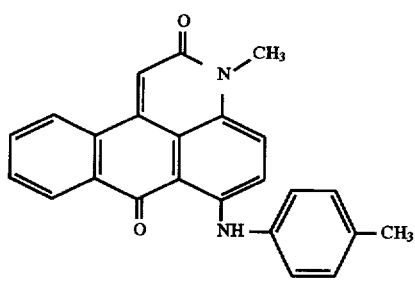
(III-5)

These dyes may be used alone or in admixture. The dye is preferably added to the polyester support in an amount of 0.001 to 1 g/m² especially 0.005 to 0.5 g/m². Differently stated, the dye is preferably used in such an amount that the transmission density of the support may be eventually increasedby 0.005 to 0.5, more preferably 0.01 to 0.3, most preferably 0.01 to 0.1.

An undercoat layer and a backcoat layer are applied to opposite surfaces of the polyester support in a conventional manner. Typically an emulsion layer is formed on the undercoat layer to form a photographic material. The composition and layer arrangement of the undercoat and backcoat layers on the polyester support and the composition and layer arrangement of the emulsion layer are not particularly limited.

Where the photographic material includes an emulsion layer coated on the polyester support in addition to the undercoat and backcoat layers, it is desirable to treat the photographic material with an aqueous solution of a protease (proteolytic enzyme) for decomposing away gelatin of the emulsion layer. This proteolytic treatment is done prior to the treatment with an alkaline aqueous solution according to the invention. Any of proteases which can hydrolyze gelatin may be used. Exemplary proteases include prbteases origi- nating from animals such as pepsin and trypsin, proteases originating from plants such as papain, chymopapain, bromelain, and ficin, and proteases originating from bacteria (or actinomycetes proteases) such as pronase. The proteolytic solution should preferably have an optimum pH level for the protease to hydrolyze gelatin and a protease concentration of 0.01 to 2.0% by weight. A surfactant is preferably used in combination with the protease since the surfactant can prevent dyes in the emulsion layer from being adsorbed to the base or support. The surfactant used in the proteolytic solution may be any one of those surfactants mentioned for the alkaline aqueous solution. Treatment with the proteolytic solution is preferably carried out at a temperature of room temperature to 70° C., more preferably 30 to 60° C. for about 5 to 200 minutes with stirring and followed bywater washing for about 1 to 30 minutes.

A material comprising a polyester support and a transparent magnetic recording layer thereon can be similarly treated with the alkaline aqueous solution for recovering the polyester support.

EXAMPLE

Examples of the present invention are given below by way of illustration and not byway of limitation. All parts are by weight.

Example 1

1) Preparation of support

PET (undyed): A film of 90 μm thick was preparedby mixing 100 parts by weight of polyethylene terephthalate having an intrinsic viscosity of 0.60 with 0.005 part by weight of spherical silica having a mean particle size of 0.3 μm and an aspect ratio (major diameter/minor diameter) of 1.07, drying the mixture in a conventional manner, melting it at 300° C., extruding it through a T die into a sheet, longitudinally stretching at 120° C. by a factor of 3.3, transversely stretching at 110° C. by a factor of 3.3, and heat setting at 240° C. for 6 seconds.

PET (gray dyed): A film of 90 μm thick was preparedby mixing 100 parts of polyethylene terephthalate having an intrinsic viscosity of 0.60 with 0.005 part of spherical silica having a mean particle size of 0.3 μm and an aspect ratio of 1.07, 66 ppm of a dye (III-5) and 54 ppm of a dye (II-6), drying the mixture in a conventional manner, melting it at 300° C., extruding it through a T die into a sheet, longitudinally stretching at 120° C. by a factor of 3.3, transversely stretching at 110° C. by a factor of 3.3, and heat setting at 240° C. for 6 seconds. The film had a transmission density of 0.07 for each of B, G and R as measured by X-RITE Status M manufactured by X-RITE Co.

PEN (gray dyed): A film of 90 μm thick was prepared by mixing 100 parts of polyethylene naphthalate having an intrinsic viscosity of 0.60 with 0.005 part of spherical silica having a mean particle size of 0.3 μm and an aspect ratio of 1.07, 54 ppm of a dye (II-24) and 54 ppm of a dye (II-6), drying the mixture in a conventional manner, melting it at 300° C., extruding it through a T die into a sheet, longitudinally stretching at 140° C. by a factor of 3.3, transversely stretching at 130° C. by a factor of 3.3, and heat setting at 250° C. for 6 seconds. The film had a transmission density of 0.07 for each of B, G and R as measured by X-RITE Status M manufactured by X-RITE Co.

PEN (blue dyed): A film of 90 μm thick was prepared by mixing 100 parts of polyethylene naphthalate having an intrinsic viscosity of 0.60 with 0.005 part of spherical silica having a mean particle size of 0.3 μm and an aspect ratio of 1.07, 65 ppm of a dye (II-24) and 240 ppm of a dye (II-3), drying the mixture in a conventional manner, melting it at 300° C., extruding it through a T die into a sheet, longitudinally stretching at 140° C. by a factor of 3.3, transversely stretching at 130° C. by a factor of 3.3, and heat setting at 250° C. for 6 seconds. The film had a transmission density of 0.06 for B, 0.09 for G, and 0.11 for R as measured by X-RITE Status M.

PEN/PET =4/1 (gray dyed): A film of 90 μm thick was prepared by mixing 80 parts of polyethylene naphthalate having an intrinsic viscosity of 0.60 and 20 parts of polyethylene terephthalate having an intrinsic viscosity of 0.60 with 0.005 part of spherical silica having a mean particle size of 0.3 μm and an aspect ratio of 1.07, 46 ppm of a dye (II-26) and 66 ppm of a dye (III-5), drying the mixture in a conventional manner, melting it at 300° C., extruding it through a T die into a sheet, longitudinally stretching at 140° C. by a factor of 3.3, transversely stretching at 130° C. by a factor of 3.3, and heat setting at 250° C. for 6 seconds. The film had a transmission density of 0.07 for B, 0.07 for G, and 0.07 for R as measured by X-RITE Status M.

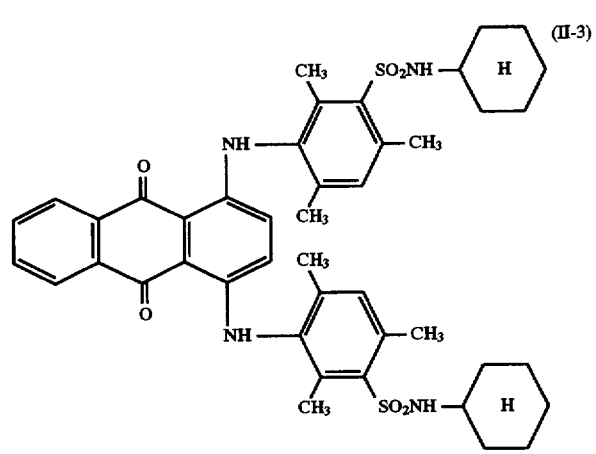

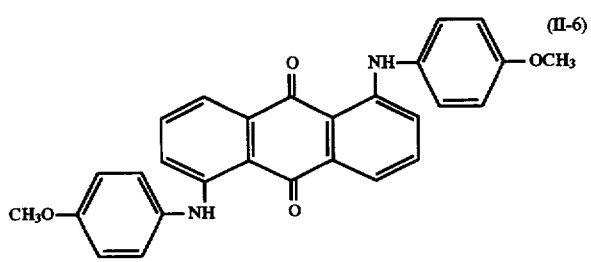

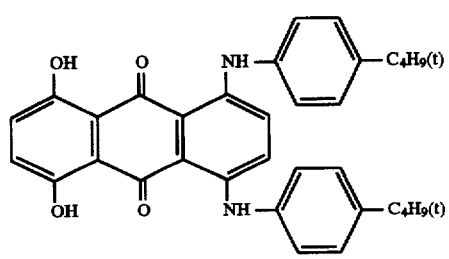

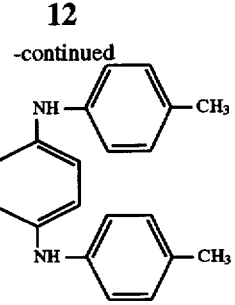

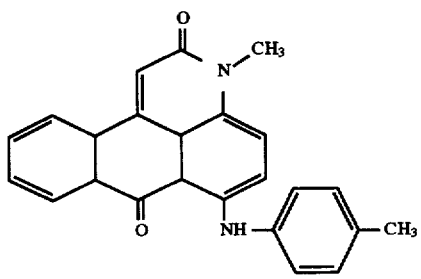

2) Heat treatment of support

The PET support or film base was heat treated at 70° C. for 24 hours and the PEN supports were heat treated at 110° C. for 24 hours. The heat treatment was carried out by wrapping the film base around a heating mandrel of 30 cm in diameter such that the surface of the film base to be coated with an undercoat layer faced outside.

3) Coating of undercoat

Each support or film base was treated on either surface with a glow discharge at a vacuum of 0.2 Torr, an output of 2,500 W and a treating intensity of 0.5 kV-A·min·/m². Thereafter, an undercoating solution of the following formulation was coated onto the support in a coating amount of 10 ml/m² and dried at 110° C. for 2 minutes.

| Undercoating solution | Parts by weight |
|---|---|
| Delimed gelatin | 1.0 |
| Salicylic acid | 0.4 |
| Polyamide-epichlorohydrin resin* | 0.1 |
| p-C₉H₁₉C₆H₄(OCH₂CH₂O)₁₀H | 0.1 |
| Distilled water | 2.2 |
| Methanol | 96.35 |

* the compound described in Example 1 of JP-A 3619/1976

4) Coating of backcoat

Each support on its surface remote from the undercoat layer was coated with a backcoat layer.

4-1) Preparation of conductive microparticulate dispersion (tin oxide-antimony oxide composite dispersion)

230 parts of stannic chloride hydrate and 23 parts of antimony trichloride were dissolved in 300 parts of ethanol to form a homogeneous solution. An aqueous solution of 1N sodium hydroxide was added dropwise to the solution until pH 3 was reached, obtaining a solution of colloidal stannic oxide and antimony oxide co-precipitate. The co-precipitate solution was allowed to stand at 50° C. for 24 hours, obtaining a red brown colloidal precipitate.

The red brown colloidal precipitate was centrifugally separated. For removing excess ions, the precipitate was washed with water by adding water thereto followedby cen,trifugal separation. This washing step was repeated three times to remove the excess ions.

200 parts of the colloidal precipitate from which the excess ions had been removed was dispersed in 1,500 parts of water again. The dispersion was sprayed in a firing furnace heated at 600° C., yielding a bluish powder of tin oxide-antimony oxide composite particles having a mean particle size of 0.1 μm. The microparticulate powder had a resistivity of 25 Ω-cm. A mixture of 40 parts of the powder and 60 parts of water was adjusted to pH 7.0, agitated by means of an agitator, and then dispersed by means of a horizontal sand mill (trade mark Dainomil manufactured by WILYA. BACHOFENAG) for a residence time of 30 minutes.

4-2) Application of backcoat layer

A primer solution of the following formulation (A) was coated onto the support so as to give a dry film thickness of 0.3 μm and dried at 110° C. for 60 seconds. A coating solution of the following formulation (B) was coated thereon so as to give a dry film thickness of 1 μm and dried at 110° C. for 2 minutes.

|  | Parts by weight |
|---|---|
| Primer solution (A) | |
| Conductive microparticulate dispersion | 10 |
| Gelatin | 1 |
| Water | 27 |
| Methanol | 60 |
| Resorcin | 2 |
| Polyoxyethylene nonyl phenyl ether | 0.01 |
| Coating solution (B) | |
| Cellulose triacetate | 1 |
| Acetone | 70 |
| Methanol | 15 |
| Dichloromethylene | 10 |
| p-chlorophenol | 4 |
| Silica particles (mean particle size 0.2 μm) | 0.01 |
| Polysiloxane | 0.005 |
| $C_{15}H_{31}COOC_{40}H_{81}/C_{50}H_{101}O(CH_2CH_2O)_{16}H$ 8/2 (weight ratio) dispersion (mean particle size 20 nm) | 0.01 |

5) ReCovery treatment 5-1) Treatment with alkaline aqueous solution

Each of the film bases or supports prepared above as having the undercoat and backcoat layers was shredded into fragments by means of a rotary cutter. The film base fragments, 800 kg, were treated with 2,000 liters of an alkaline aqueous solution with stirring. The type and concentration of alkali in the solution are shown in Table 1. In some runs, 150 g of $C_{12}H_{25}O(CH_2CH_2O)_5H$ surfactant was added to the alkaline aqueous solution. The temperature and time of treatment are also shown in Table 1.

5-2) Water washing

After the alkaline treatment, the film base fragments were washed with water at 20° to 25° C. by stirring for 30 minutes and thereafter, dried.

6) Evaluation 6-1) Recycling

The film base fragments recovered in Treatment 5) were processed into pellets by a conventional procedure, from which a film of 90 μm thick was formed again.

6-2) Transmittance

The resulting film was measured for haze according to JIS K-6714.

6-3) Foreign matter

A square sample of 10×10 cm was cut from the film and observed under a polarization microscope. The number of foreign particles having a diameter of more than 30 μm was counted.

The results are also shown in Table 1.

TABLE 1

| Run | Base | Dyeing | Alkaline treating solution Temp. (°C.) | Time (min.) | Alkali Type | Concn. | Surfactant | Transmittance | Foreign particles |
|---|---|---|---|---|---|---|---|---|---|
| Inventive 1 | PET | no | 65 | 40 | NaOH | 0.1N | no | 85% | 20 |
| Inventive 2 | PET | no | 75 | 40 | NaOH | 0.1N | no | 88% | 10 |
| Inventive 3 | PET | no | 85 | 40 | NaOH | 0.1N | no | 88% | 10 |
| Inventive 4 | PET | no | 85 | 40 | NaOH | 0.5N | no | 88% | 5 |
| Comparison 1 | PET | no | 65 | 40 | $Na_2CO_3$ | 0.1N | no | <60% | >100 |
| Comparison 2 | PET | no | 75 | 40 | $Na_2CO_3$ | 0.5N | no | <60% | >100 |
| Comparison 3 | PET | no | 85 | 40 | $Na_2CO_3$ | 0.5N | no | <60% | >100 |
| Comparison 4 | PET | no | 75 | 200 | $Na_2CO_3$ | 0.5N | no | <60% | >100 |
| Inventive 5 | PET | no | 65 | 40 | NaOH | 0.1N | added | 86% | 10 |
| Inventive 6 | PET | no | 75 | 40 | NaOH | 0.1N | added | 89% | 4 |
| Inventive 7 | PET | no | 85 | 40 | NaOH | 0.1N | added | 89% | 3 |
| Inventive 8 | PET | no | 85 | 40 | NaOH | 0.5N | added | 89% | 0 |
| Inventive 9 | PET | no | 85 | 40 | KOH | 0.5N | added | 89% | 0 |
| Inventive 10 | PET | gray | 85 | 40 | NaOH | 0.5N | added | 80% | 0 |
| Inventive 11 | PEN | gray | 65 | 40 | NaOH | 0.1N | no | 76% | 28 |
| Inventive 12 | PEN | gray | 75 | 40 | NaOH | 0.1N | no | 79% | 15 |
| Inventive 13 | PEN | gray | 85 | 40 | NaOH | 0.1N | no | 79% | 12 |
| Inventive 14 | PEN | gray | 85 | 40 | NaOH | 0.5N | no | 79% | 8 |
| Comparison 5 | PEN | gray | 65 | 40 | $Na_2CO_3$ | 0.1N | no | <60% | >100 |
| Comparison 6 | PEN | gray | 75 | 40 | $Na_2CO_3$ | 0.5N | no | <60% | >100 |
| Comparison 7 | PEN | gray | 85 | 40 | $Na_2CO_3$ | 0.5N | no | <60% | >100 |
| Comparison 8 | PEN | gray | 75 | 200 | $Na_2CO_3$ | 0.5N | no | <60% | >100 |
| Inventive 15 | PEN | gray | 65 | 40 | NaOH | 0.1N | added | 77% | 11 |

TABLE 1-continued

|  |  |  | Alkaline treating solution | | | | | | |
|---|---|---|---|---|---|---|---|---|---|
|  |  |  | Temp. | Time | Alkali | | Surfac- | Transmit- | Foreign |
| Run | Base | Dyeing | (°C.) | (min.) | Type | Concn. | tant | tance | particles |
| Inventive 16 | PEN | gray | 75 | 40 | NaOH | 0.1N | added | 80% | 5 |
| inventive 17 | PEN | gray | 85 | 40 | NaOH | 0.1N | added | 80% | 4 |
| Inventive 18 | PEN | gray | 85 | 40 | NaOH | 0.5N | added | 80% | 0 |
| Inventive 19 | PEN | gray | 85 | 40 | KOH | 0.5N | added | 80% | 0 |
| Inventive 20 | PEN | blue | 85 | 40 | NaOH | 0.5N | added | 80% | 0 |
| Inventive 21 | PEN/PET = 4/1 | gray | 85 | 40 | NaOH | 0.5N | added | 80% | 0 |

It is evident from Table 1 that those films recycled from the film base fragments recovered according to the invention contained less foreign particles and had higher transparency. No changes in color density and tone were noticed between the original and recycled films, indicating that the dyes were not leached or decomposed during the recovery treatment according to the invention.

Example 2

Samples were prepared as in Example 1 except that the undercoating solution was changed to the undercoating solution (2-2) described in JP-A 82961/1994, page 18. They were similarly treated, obtaining equivalent results to Example 1.

Example 3

Samples were prepared as in Example 1 except that the undercoating solution was changed to the undercoating solution (2-3) described in JP-A 82961/1994, pages 18–19. They were similarly treated, obtaining equivalent results to Example 1.

Example 4

Samples were prepared as in Example 1 except that instead of the glow discharge treatment, the film base on either surface was treated with ultraviolet radiation at 300 mJ/cm$^2$ from a high pressure mercury lamp spaced 20 cm from the base. They were similarly treated, obtaining equivalent results to Example 1.

Example 5

A photographic silver halide photosensitive material was prepared. The film base having undercoat and backcoat layers in Example 1 was further provided on the undercoat layer with a photosensitive layer. More specifically, a photosensitive layer of multi-layer structure was formed as described in Example 1 of JP-A 308664/1994 (Japanese Patent Application No. 122201/1993).

The photographic silver halide photosensitive material was subject to recovery treatment as follows.

5) Recovery treatment on film base having undercoat, backcoat and photosensitive layers 5-1) Proteolytic treatment The film base or support having the undercoat, backcoat and photosensitive layers was shredded into fragments by means of a rotary cutter. In 2,000 liters of water were dissolved 1,000 g of a proteolytic enzyme (Pronase E, commercially available from Kaken Kagaku K.K.) and 150 g of $C_{12}H_{25}O(CH_2CH_2O)_5H$ surfactant. The film base fragments, 800 kg, were added to the solution which was agitated at 55° C. for 30 minutes. After the proteolytic treatment, the film base fragments were wash with water by stirring at 20 to 25° C. for 30 minutes.

5-2) Recovery treatment

After the proteolytic treatment, the film base fragments were subject to alkaline aqueous solution treatment and subsequent water washing as in Example 1.

The results are shown in Table 2.

TABLE 2

|  |  |  | Alkaline treating solution | | | | | | |
|---|---|---|---|---|---|---|---|---|---|
|  |  |  | Temp. | Time | Alkali | | Surfac- | Transmit- | Foreign |
| Run | Base | Dyeing | (°C.) | (min.) | Type | Concn. | tant | tance | particles |
| Inventive 22 | PET | no | 65 | 40 | NaOH | 0.1N | no | 85% | 22 |
| Inventive 23 | PET | no | 75 | 40 | NaOH | 0.1N | no | 88% | 12 |
| Inventive 24 | PET | no | 85 | 40 | NaOH | 0.1N | no | 88% | 11 |
| Inventive 25 | PET | no | 85 | 40 | NaOH | 0.5N | no | 88% | 4 |
| Comparison 9 | PET | no | 65 | 40 | $Na_2CO_3$ | 0.1N | no | <60% | >100 |
| Comparison 10 | PET | no | 75 | 40 | $Na_2CO_3$ | 0.5N | no | <60% | >100 |
| Comparison 11 | PET | no | 85 | 40 | $Na_2CO_3$ | 0.5N | no | <60% | >100 |
| Comparison 12 | PET | no | 75 | 200 | $Na_2CO_3$ | 0.5N | no | <60% | >100 |
| Inventive 26 | PET | no | 65 | 40 | NaOH | 0.1N | added | 86% | 10 |
| Inventive 27 | PET | no | 75 | 40 | NaOH | 0.1N | added | 89% | 3 |
| Inventive 28 | PET | no | 85 | 40 | NaOH | 0.1N | added | 89% | 3 |
| Inventive 29 | PET | no | 85 | 40 | NaOH | 0.5N | added | 89% | 0 |
| Inventive 30 | PET | no | 85 | 40 | KOH | 0.5N | added | 89% | 0 |
| Inventive 31 | PET | gray | 85 | 40 | NaOH | 0.5N | added | 80% | 0 |
| Inventive 32 | PEN | gray | 65 | 40 | NaOH | 0.1N | no | 76% | 25 |

TABLE 2-continued

| | | | Alkaline treating solution | | | | | | |
|---|---|---|---|---|---|---|---|---|---|
| | | | Temp. | Time | Alkali | | Surfac- | Transmit- | Foreign |
| Run | Base | Dyeing | (°C.) | (min.) | Type | Concn. | tant | tance | particles |
| Inventive 33 | PEN | gray | 75 | 40 | NaOH | 0.1N | no | 79% | 16 |
| Inventive 34 | PEN | gray | 85 | 40 | NaOH | 0.1N | no | 79% | 10 |
| Inventive 35 | PEN | gray | 85 | 40 | NaOH | 0.5N | no | 79% | 8 |
| Comparison 13 | PEN | gray | 65 | 40 | $Na_2CO_3$ | 0.1N | no | <60% | >100 |
| Comparison 14 | PEN | gray | 75 | 40 | $Na_2CO_3$ | 0.5N | no | <60% | >100 |
| Comparison 15 | PEN | gray | 85 | 40 | $Na_2CO_3$ | 0.5N | no | <60% | >100 |
| Comparison 16 | PEN | gray | 75 | 200 | $Na_2CO_3$ | 0.5N | no | <60% | >100 |
| Inventive 36 | PEN | gray | 65 | 40 | NaOH | 0.1N | added | 77% | 12 |
| Inventive 37 | PEN | gray | 75 | 40 | NaOH | 0.1N | added | 80% | 5 |
| Inventive 38 | PEN | gray | 85 | 40 | NaOH | 0.1N | added | 80% | 3 |
| Inventive 39 | PEN | gray | 85 | 40 | NaOH | 0.5N | added | 80% | 0 |
| Inventive 40 | PEN | gray | 85 | 40 | KOH | 0.5N | added | 80% | 0 |
| Inventive 41 | PEN | blue | 85 | 40 | NaOH | 0.5N | added | 80% | 0 |
| Inventive 42 | PEN/PET = 4/1 | gray | 85 | 40 | NaOH | 0.5N | added | 80% | 0 |

According to the present invention, a photographic material comprising a polyester support and an undercoat and/or backcoat layer applied thereto is treated with an alkaline aqueous solution whereby the polyester support can be recovered for reuse without quality degradation like foreign matter contamination and transmittance losses.

While the invention has been described in connection with what is presently considered to be the most practical and preferred embodiment, it will be understood that the invention is not to be limited to the disclosed embodiment, but on the contrary, is intended to cover various modifications and equivalent changes included within the spirit and scope of the appended claims.

I claim:

1. In the disposal of a photographic material comprising a polyester support and an undercoat layer formed thereon, said polyester support has been melt dyed with a dye of formula (II) or (III):

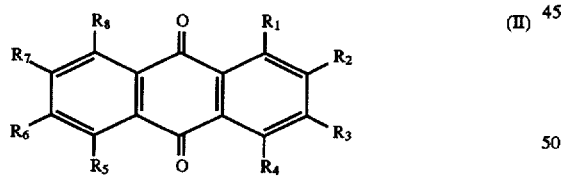

wherein $R_1$, $r_2$, $R_3$, $R_4$, $R_5$, $R_6$, $R_7$, and $R_8$, are independently selected from the group consisting of a hydrogen atom, hydroxyl radical, aliphatic radical, aromatic radical, heterocyclic radical, halogen atom, cyano radical, nitro radical, $COR_9$, $COOR_9$, $NR_9R_{10}$, $NR_{10}COR_{11}$, $NR_{11}SO_2R_{11}$, $CONR_9R_{10}$, $SO_2NR_9R_{10}$, $COR_{11}$, $SO_2R_{11}$, $OCOR_{11}$, $NR_9CONR_{10}R_{11}$, $CONHSO_2R_{11}$ and $SO_2NHCOR_{11}$, wherein $R_9$ and $R_{10}$ are independently selected from the group consisting of a hydrogen atom, aliphatic radical, aromatic radical, and heterocyclic radical, $R_{11}$ is an aliphatic radical, aromatic radical or heterocyclic radical, or $R_9$ and $R_{10}$ taken together may form a five- or six-membered ring, or $R_1$ and $R_2$ or $R_2$ and $R_3$ taken together may form a ring;

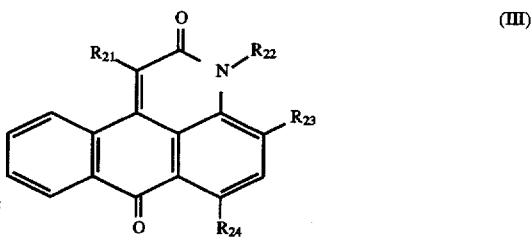

wherein $R_{21}$, $R_{23}$, $R_{24}$, are independently selected from the group consisting of a hydrogen atom, hydroxl radical, nitro radical, cyano radical, aliphatic radical, aromatic radical, $COR_{29}$, $COOR_{29}$, $NR_{29}R_{30}$, $NR_{30}COR_{31}$, and $NR_{30}SO_2R_{31}$, $R_{22}$ is an aliphatic radical or aromatic radical, $R_{29}$ and $R_{30}$ are as defined for $R_9$ and $R_{10}$ in formula (II), and $R_{31}$ is as defined for $R_{11}$ in formula (II), with the proviso that at least one of $R_{21}$, $R_{22}$, $R_{23}$, and $R_{24}$ is a radical other than hydrogen;

a method for recovering the polyester support comprising the step of treating the photographic material with an alkaline aqueous solution containing a surfactant and at least one of sodium hydroxide and potassium hydroxide, said solution having an alkali concentration of 0.5N to 10N, at a temperature of 70 to 100° C., the dye not being bleached or decomposed by the treatment.

2. The method of claim 1 wherein said surfactant is of the general formula (I):

$$C_mH_{2m+1}O(CH_2CH_2O)_nH$$

wherein m is an integer of 10 to 20 and n is an integer of 3 to 20.

3. The method of claim 1 wherein said polyester support is composed mainly of naphthalene dicarboxylic acid or dicarboxylate and ethylene glycol.

4. The method of claim 1 wherein said polyester support is composed mainly of polyethylene-2,6-naphthalene dicarboxylate.

5. The method of claim 1 wherein said polyester support is comprised of polyethylene terephthalate.

6. The method of claim 1 wherein said polyester support has been surface treated before the undercoat layer is formed thereon.

7. The method of claim 1 wherein said polyester support has been melt dyed and has a color density of at least 0.03 for each of B, G, and R.

8. The method of claim 1 wherein said solution has an alkali concentration of 0.5 to 2N.

9. The method of claim 1 wherein said treatment is carried out at a temperature of 80° to 90° C.

10. The method of claim wherein said treatment is carried out for 30 to 60 minutes.

* * * * *

UNITED STATES PATENT AND TRADEMARK OFFICE
CERTIFICATE OF CORRECTION

PATENT NO. : 5,698,378
DATED : December 16, 1997
INVENTOR(S) : Fumio KAWAMOTO

It is certified that error(s) appears in the above-identified patent and that said Letters Patent is hereby corrected as shown below:

<u>IN THE CLAIMS</u>

Col. 17, line 54, delete "$r_2$" and insert --$R_2$--.

Col. 18, line 33, delete "hydroxl" and insert --hydroxyl--.

Col. 20, line 3, after "claim" insert --1--.

Signed and Sealed this

Fifth Day of May, 1998

*Attest:*

BRUCE LEHMAN

*Attesting Officer*　　　*Commissioner of Patents and Trademarks*